US008551269B2

(12) United States Patent
Hahn

(10) Patent No.: US 8,551,269 B2
(45) Date of Patent: Oct. 8, 2013

(54) METHOD FOR CONTROLLING A LABELLING DEVICE

(75) Inventor: Wolfgang Hahn, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/147,412

(22) PCT Filed: Jan. 14, 2011

(86) PCT No.: PCT/EP2011/000152
§ 371 (c)(1), (2), (4) Date: Jan. 23, 2012

(87) PCT Pub. No.: WO2011/103944
PCT Pub. Date: Sep. 1, 2011

(65) Prior Publication Data

US 2012/0125515 A1 May 24, 2012

(30) Foreign Application Priority Data

Feb. 24, 2010 (DE) ......................... 10 2010 002 311

(51) Int. Cl.
*B32B 41/00* (2006.01)

(52) U.S. Cl.
USPC ............. 156/64; 156/350; 156/351; 156/362; 156/366; 156/367; 156/368; 156/378; 156/379

(58) Field of Classification Search
USPC ................... 156/64, 350, 351, 362, 366, 367, 156/368, 378, 379
See application file for complete search history.

(56) References Cited

U.S. PATENT DOCUMENTS

| | | | | |
|---|---|---|---|---|
| 4,147,011 | A | 4/1979 | Kronseder et al. | |
| 4,660,708 | A | 4/1987 | Willerding | |
| 5,996,322 | A | 12/1999 | La Barre | |
| 2009/0104304 | A1 | 4/2009 | Christiansen | |
| 2010/0059331 | A1 | 3/2010 | Finger | |
| 2011/0260372 | A1* | 10/2011 | Hahn | 264/500 |

FOREIGN PATENT DOCUMENTS

| | | | |
|---|---|---|---|
| DE | 119192 | A5 | 4/1976 |
| DE | 2507419 | A1 | 9/1976 |
| DE | 3310248 | C2 | 10/1986 |
| DE | 3823032 | A1 | 1/1990 |
| DE | 9403763 | U1 | 5/1994 |
| DE | 69601495 | T2 | 10/1999 |

(Continued)

OTHER PUBLICATIONS

German Search Report for DE 10 2010 002 311.6, dated Sep. 23, 2010.

(Continued)

*Primary Examiner* — Katarzyna Wyrozebski Lee
*Assistant Examiner* — Joshel Rivera
(74) *Attorney, Agent, or Firm* — Leydig, Voit & Mayer, Ltd.

(57) ABSTRACT

A method for controlling a labelling device, that is part of a block system including a supply device for supplying articles to be labeled, includes supplying, by the supply device, a predetermined number of the articles such that the labelling device and the supply device are each operated at a first operating speed. The predetermined number of the articles are delivered, in an automated manner, to the labelling device. A drive of the labelling device is decoupled from a corresponding drive of the supply device. The labelling device is then operated at a second operating speed.

12 Claims, 2 Drawing Sheets

(56) References Cited

FOREIGN PATENT DOCUMENTS

| | | | |
|---|---|---|---|
| DE | 102004053663 | A1 | 8/2005 |
| DE | 102006059001 | A1 | 6/2008 |
| DE | 102007050479 | A1 | 4/2009 |
| DE | 102008021527 | A1 | 11/2009 |
| EP | 0123361 | A1 | 10/1984 |

OTHER PUBLICATIONS

European Patent Office, International Search Report in International Patent Application No. PCT/EP2011/000152 (Mar. 5, 2011).

* cited by examiner

METHOD FOR CONTROLLING A LABELLING DEVICE

CROSS-REFERENCE TO PRIOR APPLICATIONS

This application is a U.S. National Phase application under 35 U.S.C. §371 of International Application No. PCT/EP2011/000152, filed on Jan. 14, 2011, and claims benefit to German Patent Application No. DE 10 2010 002 311.6, filed on Feb. 24, 2010.

FIELD

The present invention relates to a method for controlling a labelling device, whereby the labelling device is a part of a block system that furthermore comprises a supply device for supplying the articles to be labelled.

BACKGROUND

The settings of a labelling device are normally checked and, if necessary, corrected before production begins. For this purpose, the labelling device is operated at a slow speed so that an operator can check the individual process steps that are carried out by the labelling device, as well as the results of these process steps.

For this process, known start-up methods for labelling devices in a block system with a blow-moulding machine require that an operator first manually place the individual articles, for example, bottles, into the labelling device.

SUMMARY

In an embodiment, the present invention provides a method for controlling a labelling device that is part of a block system including a supply device for supplying articles to be labelled. A predetermined number of the articles is supplied, by the supply device, such that the labelling device and the supply device are each operated at a first operating speed. The predetermined number of the articles are delivered, in an automated manner, to the labelling device. A drive of the labelling device is decoupled from a corresponding drive of the supply device. The labelling device is then operated at a second operating speed.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
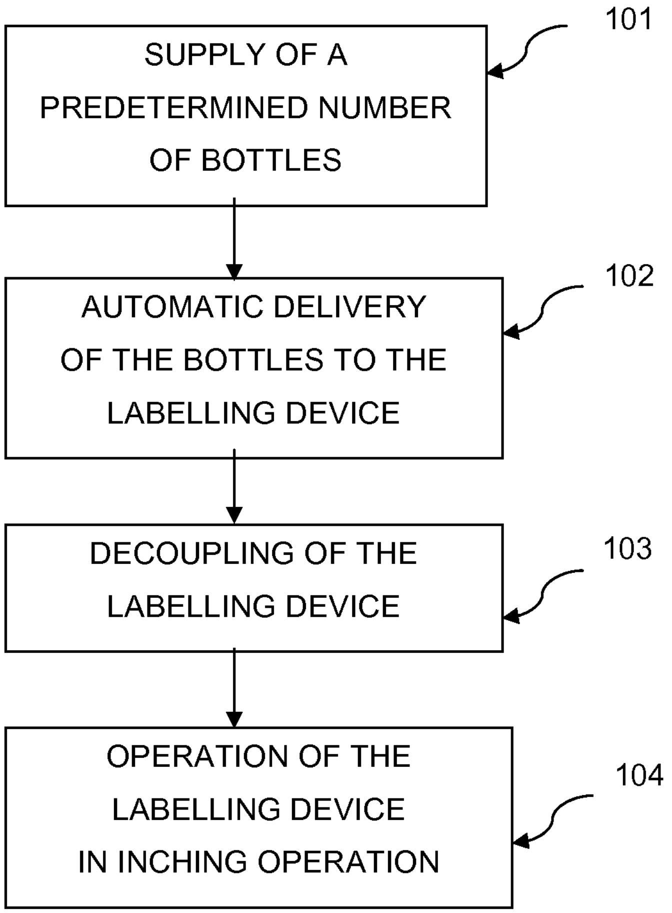
FIG. 1 an illustration of an explanatory method for controlling a block system, in the form of a flow chart.

The known start-up methods have the disadvantage, however, that the manual placement of the articles into the labelling device means an additional expenditure of labour.

It is an aspect of the present invention to provide a more efficient start-up method for a labelling device.

The method, according to an embodiment of the invention, for controlling a labelling device, whereby the labelling device is a part of a block system that furthermore comprises a supply device for supplying the articles to be labelled, comprises the steps:

Supply of a predetermined number of articles by the supply device, whereby the labelling device and the supply device are operated at a first operating speed;

Automatic delivery of the predetermined number of articles to the labelling device;

Decoupling of a drive of the labelling device from a drive of the supply device; and Operation of the labelling device at a second operating speed.

Because a predetermined number of articles are automatically delivered to the labelling device by a supply device, this method allows a more efficient start-up method for the labelling device.

The block system can comprise a plurality of sub-machines for manufacturing and/or processing the articles. In particular, the block system can comprise a blow-moulding machine for manufacturing plastic containers from preforms. In other words, the supply device can correspond to a blow-moulding machine. The supply device can also be a filling system, particularly comprising a filler and a sealing device.

The above-described method can particularly be a method for controlling a start-up method of a block system. In particular, the method can be carried out before production begins.

The articles can particularly be containers for liquids, for example, bottles or cans. In the event that the supply device corresponds to a blow-moulding machine, the articles correspond to plastic containers, particularly empty plastic bottles.

In the event that the supply device corresponds to a filling system, the articles correspond to filled and sealed containers, particularly bottles.

The labelling device serves to equip articles with one or more labels.

The second operating speed can be less than the first operating speed. In particular, the first operating speed can correspond to the production speed of the block system. In block operation, particularly all machines of the block system can be operated at the production speed of the block system.

By decoupling a drive of the labelling device from a drive of the supply device, it is possible to operate the labelling device at a different speed, particularly at a second operating speed.

The drive of the supply device can continue to be operated at the first operating speed after the step of the decoupling. In this way, the supply device can be kept ready for production. In particular, all drives of the supply device can continue to be operated at the first operating speed after the step of the decoupling.

After the predetermined number of articles have been supplied, the supply of further articles can be interrupted. As a result, the supply device, particularly one or more drives of the supply device, can continue to be operated at the first operating speed after the step of the decoupling without further articles being supplied.

After the step of the decoupling, the operating speed of the labelling device can be reduced, particularly whereby the labelling device is stopped after the step of the decoupling and before the step of operation at the second operating speed. After the labelling device has been stopped, the operation of the labelling device at the second operating speed can be started by an operator or automatically. The reduction of the operating speed of the labelling device can particularly take place continuously. In other words, after the decoupling, the drive of the labelling device can be continuously throttled or braked and finally stopped.

The operation of the labelling device at the second operating speed can particularly comprise an operation of the labelling device at the second operating speed for a predetermined length of time and, after expiration of the predetermined length of time, a stopping of the labelling device. As a result of the stopping of the labelling device after the expiration of the predetermined length of time, an operator can check an intermediate result of the labelling process and, if necessary, correct the settings of the labelling device.

The steps of the operation of the labelling device at the second operating speed and the step of the stopping of the labelling device can be carried out repeatedly, particularly alternatingly. As a result, the labelling process can be carried out in separate steps, particularly at a low operating speed, so that separate steps of the labelling process can be checked.

The step of the operation of the labelling device at the second operating speed for a predetermined length of time can be controlled by an operator. The operator can consequently, for example with the help of a control element, activate the operation of the labelling device at the second operating speed for a predetermined length of time. The operator can alternatively or additionally designate the predetermined length of time. For example, the operator can activate a control element, whereby the labelling device is operated at the second operating speed as long as the control element remains activated. When the operator deactivates the control element, the labelling device can be stopped.

The labelling device can consequently be operated in inching operation after the decoupling.

The decoupling of a drive of the labelling device can correspond to an electronic decoupling. In other words, a control element can electronically decouple the operation of a drive of the labelling device from the operation of a drive of the supply device. In particular, this can mean that the labelling device can be operated or controlled independently of the drive of the supply device.

The labelling device can comprise at least one transfer element arranged between the labelling device and the supply device, whereby the automatic delivery of the predetermined number of articles comprises a placement of the articles into the at least one transfer element.

The at least one transfer element can, for example, be a transfer star. The predetermined number of articles can be placed into the transfer element directly from the supply device or can be placed into the transfer element via an output element of the supply device.

The predetermined number can, for example, correspond to 1 to 8, particularly 3 to 5, articles. The predetermined number can be selected depending on the holding capacity of the at least one transfer element arranged between the labelling device and the supply device. In particular, the predetermined number of articles can be less than or equal to the holding capacity of the at least one transfer element.

The labelling device can comprise a plurality of drives. In particular, each of the transfer elements can comprise a drive of its own. It is possible in the step of the decoupling for a plurality of, particularly all, drives of the labelling device to be decoupled from the supply device, particularly from one or all drives of the supply device.

The automatic delivery of the predetermined number of articles can comprise a determination of whether or not the predetermined number of articles have been arranged in the transfer element. In particular, the step of the decoupling can be carried out as soon as it has been determined that the predetermined number of articles have been arranged in the transfer element.

After the step of the operation of the labelling device at the second operating speed, a synchronization of a drive of the labelling device with a drive of the supply device and an operation of the labelling device and the supply device at the first operating speed can take place. As a result, the block system can be operated at the production speed as soon as the settings of the labelling device have been checked and, if necessary, corrected.

After the synchronization of a drive of the labelling device with a drive of the supply device, an interruption in the supply of further articles by the supply device can be revoked. In other words, the supply device can supply further articles after the synchronization.

The invention, in an embodiment, furthermore provides a control element for controlling a labelling device, whereby the control element is configured or formed for carrying out a method as described above.

The invention, in an embodiment, furthermore provides a block system comprising a labelling device for equipping articles, particularly bottles, with a label and a supply device for supplying the articles to be labelled, whereby the block system furthermore comprises a control element for controlling the block system, particularly the labelling device, according to a method as described above.

The block system can comprise a blow-moulding machine and/or a filling system as the supply device.

The block system can furthermore comprise a blocking element that is formed in such a way that after the predetermined number of articles have been supplied, the supply of further articles can be interrupted. The blocking element can, for example, be a preform block that, when activated, prevents the preforms from being placed into a blow-moulding machine.

FIG. 1 illustrates an explanatory method for controlling a block system. In the following, it is assumed that the explanatory block system comprises a labelling device for equipping bottles with a label and a blow-moulding machine for producing the bottles, particularly plastic bottles, to be labelled. In principle, however, other articles, for example, cans or the like, are also possible, as are other supply devices, for example, filling systems.

In Step 101 of the explanatory method, the blow-moulding machine produces a predetermined number of bottles, for example, 1-8, particularly 3-5, units. In order to interrupt the production of further bottles, a preform block can be activated that prevents further plastic preforms from being placed into the blow-moulding machine.

In Step 102, the produced bottles are placed into at least one transfer star. After the last bottle has been delivered from the blow-moulding machine to the at least one transfer star, in Step 103 the labelling device is electronically decoupled from the blow-moulding machine, braked and brought to a stop. This means that the drives of the labelling device are electronically decoupled from the drives of the blow-moulding machine.

In the meantime, the blow-moulding machine continues to be operated at the production speed. No further bottles are produced, however, because the preform block interrupts the placement of preforms into the blow-moulding machine.

The bottles located in the transfer stars are used in Step 104 for operating the labelling device at the second speed.

In particular, the bottles can be used for a procedure for adjusting the labelling device. For this purpose, the labelling device can be operated in inching operation. Inching operation is operation of the labelling device that is controlled by an operator, whereby the operator controls the operation of the labelling device at the second operating speed for a predetermined time or for a predetermined action. For example, the labelling device can be operated at the second operating speed for as long as the operator keeps a control element activated. The labelling device is stopped after the control element has been deactivated. In particular, this can be carried out a number of times, one after the other, so that the operator can observe the individual operating steps of the labelling device and, if necessary, correct the settings.

The operator can alternatively or additionally cause the labelling device to be operated at the second speed for a predetermined time or for a predetermined labelling step by activating a control element. The predetermined time can, for example, amount to one or more seconds or up to one minute, particularly 5 seconds to 20 seconds.

After the successful adjustment of the labelling device, the block system is switched to the production speed, particularly by means of re-synchronizing the labelling device to the blow-moulding machine. The preform block, which has prevented further production after the predetermined number of bottles have been produced, can be opened again and the production of bottles can consequently be restarted.

Figure 2:
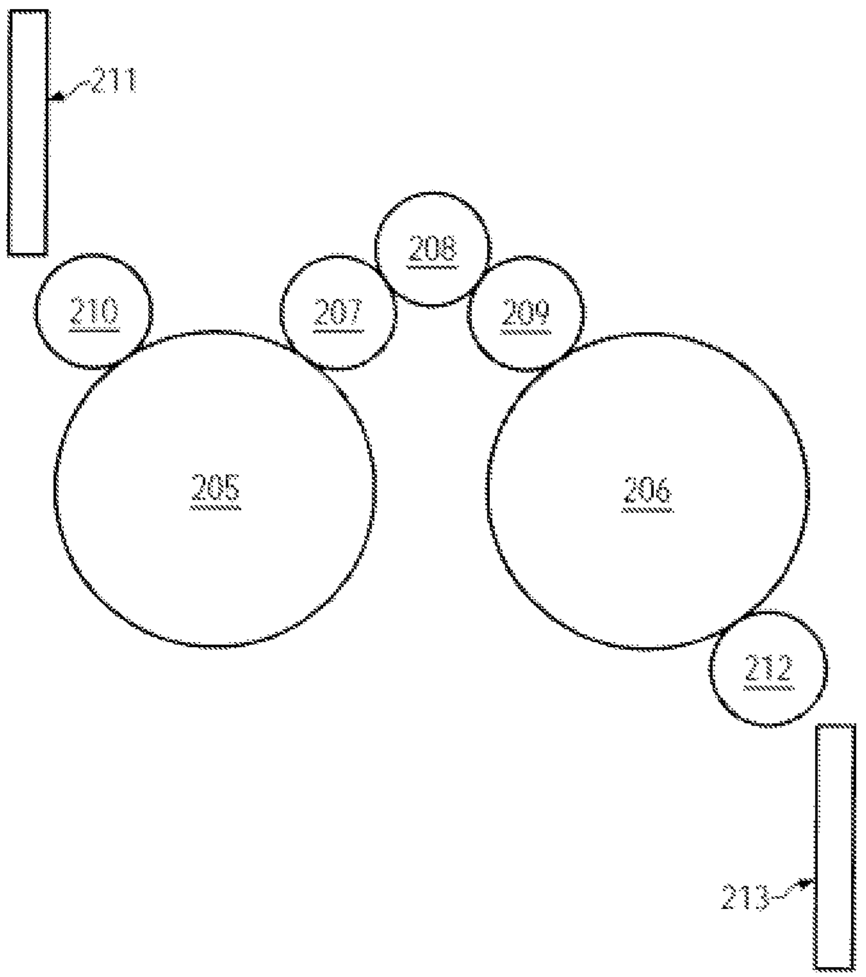
FIG. 2 an illustration of an explanatory block system.

FIG. 2 shows an explanatory block system for which a method as described above can be carried out as the start-up method, i.e., before the production operation.

In particular, FIG. 2 shows a blow-moulding machine 205 which blow-moulds bottles from plastic preforms, which are directed into the blow-moulding machine via a transport element 211 and an inlet star 210. The blow-moulded bottles can be directed to a labelling device 206 via transfer stars 207, 208, 209. The bottles are each given one or more labels in the labelling device 206, and are then delivered to a further transport section 213 for further transport via an outlet star 212.

If the block system is operated with a method as described above, the blow-moulding machine 205 produces a predetermined number of bottles. A blocking element, for example, in the transport element 211, can temporarily prevent a further feeding of preforms to the blow-moulding machine 205. In this way, the blow-moulding machine 205 can continue to be operated at production speed while the labelling device 206 is decoupled, without the blow-moulding machine 205 producing bottles.

The decoupling of the labelling device 206, particularly the decoupling of a drive of the labelling device 206 from a drive of the blow-moulding machine 205, can then be carried out when the last of the predetermined number of bottles has been delivered from the blow-moulding machine 205 to the transport elements 207, 208 and 209.

After the labelling device 206 has been successfully adjusted, the labelling device 206 can be resynchronized to the blow-moulding machine 205. The blocking element, i.e., the preform block, can thereupon be opened, as a result of which the production of the bottles and the labelling of the bottles can be taken up in production operation.

It is understood that characteristics mentioned in the previously described embodiments are not limited to these special combinations and are possible in any other combinations. While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

What is claimed is:

1. A method for controlling a labelling device that is part of a block system including a supply device for supplying articles to be labelled, the method comprising:

supplying, by the supply device, a predetermined number of the articles such that the labelling device and the supply device are each operated at a first operating speed;

delivering, in an automated manner, the predetermined number of the articles to the labelling device;

decoupling a drive of the labelling device from a corresponding drive of the supply device; and operating the labelling device at a second operating speed for a predetermined length of time and stopping the labeling device after the predetermined length of time has passed, the operating of the labeling device at the second operating speed and the stopping of the labeling device being carried out repeatedly.

2. The method according to claim 1, wherein the second operating speed is less than the first operating speed.

3. The method according to claim 1, wherein the drive of the supply device continues to be operated at the first operating speed after the decoupling.

4. The method according to claim 1, wherein, after the decoupling, the operating speed of the labelling device is reduced.

5. The method according to claim 1, wherein the labelling device is stopped after the decoupling and before the operating at the second operating speed.

6. The method according to 1, wherein the operating of the labelling device at the second operating speed for a predetermined time is controlled by an operator.

7. The method according to claim 1, wherein the operating of the labelling device at the second operating speed and the stopping of the labelling device are carried are repeated in an alternating manner.

8. The method according to claim 1, wherein the decoupling of the drive of the labelling device is performed using an electronic decoupling.

9. The method according to claim 1, wherein the labelling device includes at least one transfer element disposed between the labelling device and the supply device and wherein the delivering includes placing the predetermined number of the articles into the at least one transfer element.

10. The method according to claim 9, wherein the delivering of the predetermined number of the articles includes determining whether the predetermined number of the articles have been arranged in the at least one transfer element.

11. The method according to claim 1, further comprising, after the operating of the labelling device at the second operating speed:

synchronizing the drive of the labelling device with the corresponding drive of the supply device; and operating the labelling device and the supply device at the first operating speed.

12. The method according to claim 1, wherein the supply device includes a blow-molding machine configured to produce plastic containers.

* * * * *